Patented Aug. 22, 1950

2,519,336

UNITED STATES PATENT OFFICE 2,519,336

SEPARATION OF DIALKYL BENZENES

Leland K. Beach, Mountainside, and Charles E. Morrell, Westfield, N. J., assignors to Standard Oil Development Company, a corporation of Delaware No Drawing. Application May 2, 1946, Serial No. 666,837

3 Claims. (Cl. 260—674)

This invention is concerned with separation of dialkyl benzene isomers using a selective sulfonation cooperatively with fractional crystallization and fractional hydrolysis.

For certain practical purposes, it is important to isolate a dialkyl benzene compound from an isomeric compound by methods other than fractional distillation. For example, meta and para xylenes with boiling points of 139.3° C. and 138.5° C., respectively, are difficult to separate by fractional distillation. Separation of the isomers by fractional crystallization at freezing temperatures is an expensive and tedious operation if applied to mixtures as normally available. Separation of the isomers by selective sulfonation alone is unsatisfactory and it has been difficult to obtain good yields of pure products from the selectively sulfonated mixtures.

An object of this invention is to provide an improved method of utilizing a selective or preferential sulfonation for segregating dialkyl benzene isomers.

A further object is to provide an efficient method of separating the isomers by selective sulfonation in cooperation with other steps, such as fractional crystallization and fractional hydrolysis.

The selective sulfonation of one dialkyl benzene component in preference to the sulfonation of an isomeric component mixed therewith can be demonstrated to be influenced by certain factors, as follows:

(1) Increase in proportion of isomer mixture to the sulfonating agent favors preferential sulfonation of one of the isomers.

(2) Increased dilution of the sulfonating acid by sulfonation product favors preferential sulfonation.

Also, increased concentration of the isomer less susceptible to sulfonation favors separation of unsulfonated isomers from sulfonated isomers. In any event one isomer is not exclusively sulfonated or separated from the other isomer in a practical operation.

The factors of excess hydrocarbon feed to sulfonating agent, dilution of the sufonating acid by sulfonation product, and dilution of the hydrocarbon reactant for favoring selective reaction are contrary to general practices in ordinary sulfonation procedures. Moreover, it will be appreciated that selective sulfonation as practiced for the purposes of the present invention may be considered as partaking of the nature of a solvent extraction treatment wherein the unreacted isomers constitute the raffinate and the absorbed or reacted isomers form the extract which is miscible with the sulfonating acid.

For the purposes of this invention, proper steps are taken to obtain a high yield of raffinate with increased content of the higher freezing point isomer relative to the initial isomer mixture.

The raffinate removed from the acid extract of sulfonated isomers upon being cooled to moderately low temperatures precipitates pure crystals of the higher freezing point isomer. It can be seen that by having the raffinate contain a larger amount of the higher freezing point isomer, the temperature of crystallization is made higher, thus reducing operation difficulties and refrigeration requirements.

The sulfonated isomer extract in acid solution upon being subjected to a controlled steam distillation yields separate isomer fractions of fairly high purity. The fraction rich in higher freezing point isomer is also suitable for the fractional crystallization alone or together with the raffinate for separation of a pure isomer product.

The mother liquors obtained in the fractional crystallization down to moderately low temperatures are again subjected advantageously to selective sulfonation for a repeated removal of one of the isomers.

Some of the advantages of the method described are: recovery of individually concentrated or pure isomers under more practical conditions; elimination of waste; and economy in refrigeration.

It is to be understood that the present invention is useful in the isolation and purification of various dialkyl benzene isomers for which m- and p-xylenes, diethyl benzenes, and other $C_8$ to $C_{10}$ dialkyl benzenes serve as examples.

For illustration of how the principles set forth are used, selective sulfonation of mixed m- and p-xylenes will be considered particularly. A close cut aromatic hydrocarbon fraction boiling in the range 138–140° C., obtained by fractional distillation of a solvent extract, will generally be found to be high in m-xylene and somewhat lower in p-xylene and very low in o-xylene and ethyl benzene. Selective sulfonation of the fraction may be carried out at temperatures in the range 20° C. to 100° C. with about 70% to 100% strength sulfuric acid as sulfonating agent. The proportion of hydrocarbon feed and time of contact are also controlled to keep a substantial amount of the hydrocarbon feed unreacted. If desired, inert gases may be passed through the reaction zone for removal of water in maintaining the acid concentration at a given level. The unreacted and unabsorbed portion of the feed forms a liquid raffinate phase which is distilled or decanted from the extract solution phase that stratifies as a denser liquid layer when the reaction mixture is settled.

The raffinate removed from the acid extract solution shows a higher freezing point than the initial hydrocarbon feed in proportion to the increased concentration of p-xylene (F. P. 13° C.) it contains. By cooling the raffinate to a moderately low temperature, e. g., about 0° C., p-xylene crystals are formed and are separated by filtration from the mother liquor.

As the p-xylene is removed from the raffinate, the proportion of m-xylene is increased in the mother liquor and the freezing point of the mother liquor becomes lower until it is impractical to freeze out more p-xylene. At this point, it is advantageous to subject the mother liquor again to selective sulfonation for extraction of more m-xylene. Thus, the process is adapted for a continuous cyclic procedure in which the mother liquor is recycled for repeated selective sulfonation.

The acid extract phase removed from the raffinate phase on being subjected to steam distillation undergoes hydrolysis. The m-xylene sulfonic acid is hydrolyzed at a relatively lower temperature than the p-xylene sulfonic acid. The distillate recovered from the extract, steam distilled at 140° C. to 170° C., is rich in m-xylene; and later when the temperature of the residual extract is raised to within the range 170°–200° C., the distillate is richer in p-xylene. The p-xylene-rich distillate is suitable for fractional crystallization at moderately low temperatures alone or with the raffinate.

Test data demonstrating the principles set forth are given in the following examples and tables:

EXAMPLE 1

One volume of a xylene feed containing 30% p-xylene and 67% m-xylene was mixed with one volume of 95% $H_2SO_4$ at 30° C. to 45° C. The mixture was agitated for successively increased periods, and samples were taken of the raffinate and extract phases for analysis by freezing point. The following analytical results were obtained:

Table 1

| Test | Vol. Per Cent Xylene Feed Unabsorbed | Vol. Per Cent p-Xylene Unabsorbed | Freezing Point of Raffinate | Vol. Per Cent p-Xylene in Raffinate |
|---|---|---|---|---|
| | | | °C. | |
| 1[1] | 100 | 100 | −26 | 30 |
| 2 | 57 | 64 | −24 | 34 |
| 3 | 23 | 38 | −12 | 50 |
| 4 | 14 | 30 | −4 | 63 |

[1] Initial feed.

The above data indicate that, as the acid sulfonating agent becomes diluted by absorbed and reacted xylenes, there is an increased concentration of unabsorbed p-xylene in the raffinate. At the same time, however, the yield of raffinate diminishes to a low level faster than the increase of p-xylene concentration in the raffinate. Accordingly, it is advantageous to increase the yield of raffinate at the expense of purity in the initial stages of selective sulfonation.

EXAMPLE 2

Increased proportions of the hydrocarbon feed to the acid were used under comparative conditions in obtaining the following test results:

Table 2

| Vol. Ratio Hydrocarbon Feed to Acid | Vol. Per Cent Feed Unabsorbed | Vol. Per Cent p-Xylene Unabsorbed | Freezing Point of Raffinate | Vol. Per Cent p-Xylene in Raffinate |
|---|---|---|---|---|
| | | | °C. | |
| 1:1 | 57 | 64 | −24 | 34 |
| 2:1 | 55 | 77 | −18 | 42 |
| 3:1 | 75 | 87 | −23 | 35 |

The above data show that increased p-xylene segregation is obtained by increasing the ratio of hydrocarbon feed to the sulfonating acid.

Further increased segregation may also be obtained by diluting the reaction mixture or the reaction products with low boiling paraffinic hydrocarbons which are inert in the sulfonation, e. g., by pentanes or hexanes; and in the course of the sulfonation, the sulfonating acid may be diluted by recycled sulfonic acids.

Increased separation of p-xylene by having increased concentrations of p-xylene in the feed sulfonated is evidenced in the following data:

Table 3

| Feed Composition | Freezing Point of Feed | Raffinate Yield, Per Cent Feed | Freezing Point of Raffinate | Purity Per Cent p-Xylene in Raffinate |
|---|---|---|---|---|
| | °C. | | °C. | |
| 30% p-, 67% m-xylenes | −26 | 14 | −4 | 63 |
| 55% p-, 40% m-xylenes | −7 | 63 | −0.5 | 70 |

Procedures in practicing the invention are exemplified as follows:

A major volume proportion of an initial xylene cut containing 30% p- and 67% m-xylenes is mixed and heated to 40° C. with 95% $H_2SO_4$ until at least one-fourth but not more than three-fourths of the xylenes are absorbed. The unabsorbed xylenes, comprising preferably more than one-half the feed mixture, are separated as a raffinate oil from the acid extract solution. The extract solution is subjected to steam distillation to obtain at least two main cuts, one of these cuts being recovered at a stillpot temperature around 140° C. and below 170° C. and the other up to 200° C. An intermediate cut containing, for example, 30 to 50% para xylene, may be sent back to the sulfonation zone. The higher boiling main cut rich in p-xylene is admixed with raffinate obtained from the selective sulfonation for cooling to a moderately low temperature above −30° C. The precipitated p-xylene crystals are removed by filtration and the mother liquor retaining above 30% p-xylene is recycled for selective sulfonation.

In the separation of the isomers by using only freezing and filtration on the mixture, an expensive and complicated method has to be used. The para xylene forms a eutectic with the meta xylene, thus making separation difficult even at −53° C. or below.

With the present method both para and meta xylenes are recoverable completely in high purity without having to use low freezing temperatures at which the eutectic forms, thus making a considerable improvement over the prior art.

In the present process the isomer mixtures are treated cyclically in two main stages, selective sufonation-hydrolysis and fractional crystallization-filtration.

The feed for the sulfonation is, in general, a mixture of the isomers with a para xylene concentration of 30 to 50 volume per cent. Steps are taken to have most of the meta xylene sulfonated and extracted from the feed yet leave a substantial yield of raffinate enriched in para xylene. By controlled steam distillation hydrolysis of the acid extract separated from the raffinate, a relatively pure meta xylene fraction and a fraction suitably rich in para xylene for the fractional crystallifiation are recovered. Intermediate products obtained in the steam distillation may be recycled to the sulfonation stage.

For the fractional crystallization, the xylene mixture to be subjected to freezing should contain preferably 50 to 80 volume per cent of para xylene. In this stage, the feed, with or without a diluent, is cooled with agitation to crystallize out para xylene. The crystals are removed by filtration, washed, and fractionally melted to recover pure para xylene as a product. Some of the first meltings may be discarded or be added to feed subjected to freezing. By using only freezing points higher than the eutectic mixture freezing point, the mother liquor still contains a considerable proportion of para xylene. At freezing points of −12° to −30° C., the mother liquors free of solvent or diluent contain 30 to 50 per cent of para xylene and can be thus appropriately used as feed to the sulfonation stage.

We claim:

1. The method of separating para xylene from meta xylene, which comprises predominantly sulfonating meta xylene in a feed mixture of said xylenes containing sufficient para xylene to enable para xylene to be separated therefrom by crystallization until at least one-fourth of the xylenes remain unreacted in the mixture, separating a raffinate fraction of the unreacted xylenes from an acid extract of the xylenes sulfonated in the mixture, heating the acid extract to a temperature in the range 140° C. to 170° C., steam distilling from the acid extract thus heated a meta xylene rich cut, heating residual acid extract of the steam distillation to a temperature in the range 170° C. to 200° C., steam distilling a para xylene rich cut from the thus-heated residual acid extract, freezing out para xylene crystals from the raffinate and said para xylene rich cut until mother liquors of the crystallization retain at least 30% of para xylene, and using said mother liquors in the feed mixture for said sulfonating as hereinbefore stated.

2. The method of separating para xylene from meta xylene, which comprises predominantly sulfonating meta xylene of a xylene feed containing at least 30% para xylene until at least one-fourth of the xylenes remain unreacted in the feed mixture, separating sulfonated xylenes of the feed from a raffinate having a higher para xylene concentration than the feed, steam distilling from the sulfonated xylenes a series of fractions having increasing para xylene content, recycling to the feed for sulfonation an intermediate fraction of medium para xylene content from said series, adding a higher boiling fraction rich in para xylene from said series to said raffinate, crystallizing para xylene from the mixture of raffinate and the higher boiling steam distillation fraction, and recycling to the feed for sulfonation crystallization mother liquors in which at least 30% of xylenes present is para xylene.

3. A process for separating substantially pure m- and p-xylenes from a mixture of isomeric xylenes including m- and p-xylenes and containing sufficient para xylene to enable para xylene to be separated therefrom by crystallization which comprises sulfonating the mixture by heating it with at least equal volumes of sulfuric acid of 70–100% initial concentration, maintaining the reaction mixture at a temperature of 20–100° C. during sulfonation for a period of time until at least one-four but not more than three-fourths of the xylenes are reacted and absorbed as an extract by the acid leaving a raffinate containing p-xylene, separating the raffinate and the extract, heating the extract with steam at a temperature between 140°–170° C. to separate a m-xylene rich cut, heating the residual extract to 170°–200° C. with steam to separate a p-xylene rich cut, combining the p-xylene rich cut with the raffinate to form a mixture containing relatively more p-xylene than was present in the initial xylene feed mixture, cooling the combined raffinate and p-xylene cut to a temperature between −4° to −30° C. whereby a substantial crystallization of the p-xylene results and recycling the mother liquor to the sulfonation step.

LELAND K. BEACH.
CHARLES E. MORRELL.

REFERENCES CITED

The following references are of record in the file of this patent:

UNITED STATES PATENTS

| Number | Name | Date |
|---|---|---|
| 1,503,937 | Cannon | Aug. 5, 1924 |
| 1,940,065 | Spannagel et al. | Dec. 19, 1933 |
| 2,393,888 | Cole | Jan. 29, 1946 |
| 2,398,526 | Greenburg | Apr. 16, 1946 |

OTHER REFERENCES

Kizhner et al.: Chem. Abs., vol. 20, 2316 (1926).
White et al.: Bur. of Stand. Jour. of Res.; Res. Paper No. 501, vol. 9, 716–7 (1932).
Levinstein: Berichte, vol. 17, 444–6 (1884).
Kravchenko: Chem. Ab., vol. 36, 4016 (1942).
Nakatsuchi: Chem. Ab., vol. 20, 1020 (1926).